United States Patent
Himetani et al.

(10) Patent No.: US 8,978,512 B2
(45) Date of Patent: Mar. 17, 2015

(54) OPERATING PEDAL AND OVERLAPPING WELDING METHOD

(75) Inventors: Yoshiro Himetani, Toyota (JP);
Nobuyuki Kawahara, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 762 days.

(21) Appl. No.: 12/923,310

(22) Filed: Sep. 14, 2010

(65) Prior Publication Data

US 2011/0094330 A1   Apr. 28, 2011

(30) Foreign Application Priority Data

Sep. 17, 2009   (JP) ................................. 2009-216272

(51) Int. Cl.
| | |
|---|---|
| *G05G 1/44* | (2008.04) |
| *G05G 1/30* | (2008.04) |
| *B60T 7/06* | (2006.01) |
| *G05G 1/50* | (2008.04) |

(52) U.S. Cl.
CPC .. *B60T 7/06* (2013.01); *G05G 1/506* (2013.01)
USPC ................... 74/512; 74/513; 74/514; 74/560; 228/101; 219/137 R (58) Field of Classification Search
CPC .................................. B60T 7/06; G05G 1/506
USPC .......... 228/101; 74/512–514, 560; 219/137 R
See application file for complete search history.

(56) References Cited

U.S. PATENT DOCUMENTS

| | | | | |
|---|---|---|---|---|
| 3,744,340 | A * | 7/1973 | Peterson ......................... | 74/560 |
| 6,513,407 | B1 * | 2/2003 | Higgins ......................... | 74/560 |
| 8,393,245 | B2 * | 3/2013 | Himetani ....................... | 74/512 |
| 8,650,986 | B2 * | 2/2014 | Yamamoto ..................... | 74/560 |
| 2010/0180717 | A1 * | 7/2010 | Himetani ....................... | 74/560 |
| 2010/0307284 | A1 * | 12/2010 | Himetani et al. ............... | 74/560 |
| 2011/0268494 | A1 * | 11/2011 | Pacchione et al. ............ | 403/270 |

FOREIGN PATENT DOCUMENTS

DE             4335295  A1 *   4/1994   ............... G05G 1/14

(Continued)

OTHER PUBLICATIONS

Machine Translation of JP 2007-122610, Yoshihiro et al., May 17, 2007.*

(Continued)

*Primary Examiner* — Vinh Luong
(74) *Attorney, Agent, or Firm* — Finnegan, Henderson, Farabow, Garrett & Dunner, LLP (57) ABSTRACT

An operating pedal includes a joining portion at which a first member and a second member whose thickness is smaller than a thickness of the first member are overlapped with each other, and welded to each other along an end edge of the second member, a step portion being provided in the first member along the end edge of the second member by recessing a protruding portion that outwardly protrudes from the end edge so that the protruding portion is drawn back from the second member; and the first member and the second member being welded to each other at a portion extending from the end edge of the second member to the step portion of the first member.

3 Claims, 6 Drawing Sheets

(56) References Cited

FOREIGN PATENT DOCUMENTS

| | | | | |
|---|---|---|---|---|
| FR | 2821684 | * | 9/2002 | ................ G09G 1/14 |
| GB | 616981 | * | 1/1949 | ....................... 74/512 |
| JP | 39-24920 | * | 8/1964 | ....................... 74/512 |
| JP | 3-81479 | | 8/1991 | |
| JP | 11-58039 | * | 3/1999 | ............. B23K 20/12 |
| JP | 2007-122610 | | 5/2007 | |

OTHER PUBLICATIONS

USPTO Translation of JP 3-81479, Sugino et al., Aug. 1991.*
Abstract of FR 2821684, Denis, Sep. 2002.*
English Abstract of DE 4335295 A1, Douglas, Apr. 1994.*
Office Action for JP Appl. No. 2009-216272 dated Jul. 31, 2012.
Office Action for Chinese Appl. No. 201010287338.1 dated Mar. 5, 2013.

\* cited by examiner

OPERATING PEDAL AND OVERLAPPING WELDING METHOD

INCORPORATION BY REFERENCE

The disclosure of Japanese Patent Application No. 2009-216272 filed on Sep. 17, 2009 including the specification, drawings and abstract is incorporated herein by reference in its entirety.

BACKGROUND OF THE INVENTION

1. Field of the Invention

The invention relates to an operating pedal, and particularly to improvement of an operating pedal that includes a joining portion at which two members are overlapped with each other and welded to each other.

2. Description of the Related Art

An operating pedal, in which a boss with a cylindrical shape is disposed to extend through a pedal arm, and integrally welded to the pedal arm, is known. The pedal arm is made of a thin plate and has a hollow structure. The operating pedal is supported to be pivotable around a center line of the boss. A vehicle operating pedal described in Japanese Patent Application Publication No. 2007-122610 (JP-A-2007-122610) is an example of the operating pedal. In the vehicle operating pedal, a pedal arm, which is made of a thin plate and has a hollow structure, is formed by welding outer peripheral portions of paired half bodies to each other. Each of the paired half bodies has a shape obtained by dividing the pedal arm in a vehicle width direction. A boss is disposed to extend through boss attachment cylindrical portions provided in the half bodies by operating a burring-hole forming process. The boss is integrally fixed to the boss attachment cylindrical portions.

Figure 6A:
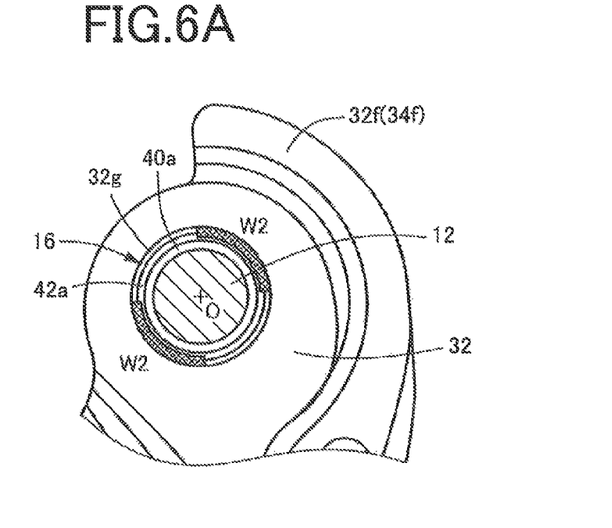

FIG. 6A is a sectional view explaining an example of a joining portion at which a pedal arm 14 and a boss 100 are joined to each other in a conventional operating pedal. FIG. 6A is a diagram corresponding to a section taken along a line IIIA-IIIA in FIG. 2. The pedal arm 14 is formed by welding outer peripheral portions of paired half bodies 32 and 34 to each other. Each of the paired half bodies 32 and 34 has a shape obtained by dividing the pedal arm 14 in the vehicle width direction. Thus, the pedal arm 14 is made of a thin plate and has a hollow structure. Outer peripheral flanges 32f and 34f are provided in the half bodies 32 and 34, respectively. While the outer peripheral flanges 32f and 34f are overlapped with each other, the outer peripheral flanges 32f and 34f are integrally welded to each other, for example, by arc welding. A first joining portion W1 (a blacked-out region) is a joining portion at which the outer peripheral flanges 32f and 34f are joined to each other. Boss attachment cylindrical portions 32g and 34g with a cylindrical shape are provided in the half bodies 32 and 34, respectively, by operating a burring-hole forming process and the like. The boss 100 with a cylindrical shape is disposed to extend through the boss attachment cylindrical portions 32g and 34g. The boss 100 is integrally fixed to the boss attachment cylindrical portions 32g and 34g, for example, by arc welding or laser welding. Second joining portions W2 (mesh regions) are joining portions at which the boss attachment cylindrical portions 32g and 34g and the boss 100 are joined to each other. The boss attachment cylindrical portions 32g and 34g and the boss 100 are discontinuously joined to each other at the joining portions located at predetermined intervals around a center line O.

Figure 6B:
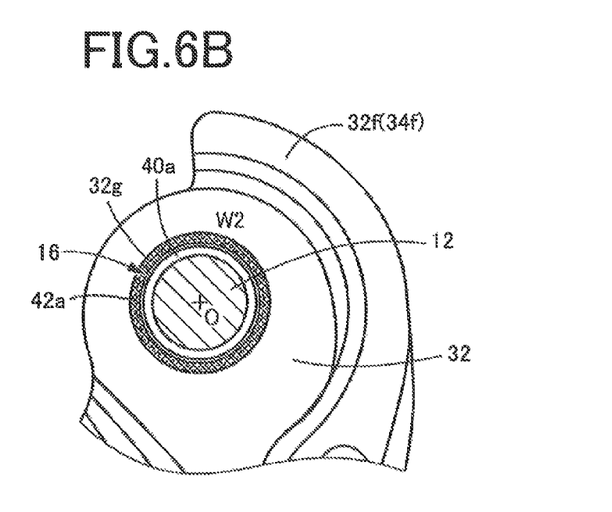

However, when the boss 100 and the boss attachment cylindrical portions 32g and 34g are welded to each other, for example, by plasma arc welding while the boss 100 is fitted in the boss attachment cylindrical portions 32g and 34g, and outer peripheral surfaces of the boss 100 are overlapped with the boss attachment cylindrical portions 32g and 34g, because the thickness (plate thickness) of each of the boss attachment cylindrical portions 32g and 34g is smaller than the thickness of the boss 100, heat input to the boss 100 tends to be insufficient, and heat input to the boss attachment cylindrical portions 32g and 34g tends to be excessive. Thus, joining failure is easily to occur. That is, the amount of heat input to the boss 100 needs to be larger than the amount of heat input to the boss attachment cylindrical portions 32g and 34g, in order to generate a molten pool, and as a result, there is a problem that, for example, a throat of weld is decreased in thickness due to a decrease in the amount of molten metal in the boss attachment cylindrical portions 32g and 34g, and expansion of a melting width (expansion toward a right side in FIG. 6B. FIG. 6B is a sectional view showing an enlarged VIIB portion in FIG. 6A, which is rotated by 90° in a counterclockwise direction. The thickness (throat thickness) D of the joining portion at a position near a border between the second joining portion W2 and the boss attachment cylindrical portion 32g of the half body 32 becomes small, and therefore, there is a possibility that joint strength may be deteriorated. In addition, because the amount of heat input to the boss 100 becomes large, there is a possibility that heat strain may occur in the boss 100, and the inner diameter of the boss 100 may be changed, and thus, performance of supporting the boss 100 using the support shaft may be deteriorated.

The problems occur not only in the joining portion between the pedal arm and the boss, but also in other joining portions, for example, a joining portion between the pedal arm and the pedal sheet.

SUMMARY OF THE INVENTION

The invention has been made under such circumstances and an object of the invention is to suppress occurrence of joining failure and heat strain due to imbalance in the amount of input heat when two members constituting an operating pedal are overlapped with each other and welded to each other.

The object indicated above is achieved in the first aspect of the present invention, which provides an operating pedal including a joining portion at which a first member and a second member whose thickness is smaller than a thickness of the first member are overlapped with each other, and welded to each other along an end edge of the second member, wherein (a) a step portion is provided in the first member along the end edge of the second member by recessing a protruding portion that outwardly protrudes from the end edge so that the protruding portion is drawn back from the second member; and (b) the first member and the second member are welded to each other at a portion extending from the end edge of the second member to the step portion of the first member.

The object indicated above is achieved in the second aspect of the present invention, which provides the operating pedal according to the first aspect of the present invention, wherein (a) the second member is a pedal arm which is made of a thin plate and has a hollow structure, and in which a boss attachment cylindrical portion with a cylindrical shape is provided to outwardly protrude; (b) the first member is a boss with a cylindrical shape, which is disposed to extend through the boss attachment cylindrical portion, and integrally welded to the boss attachment cylindrical portion, and of which the operating pedal is supported to be pivotable around a center line; and (c) an inner diameter of the boss is constant over an entire length of the boss, the protruding portion is an end portion in an axial direction, which outwardly protrudes from the boss attachment cylindrical portion, and the step portion is provided by decreasing an outer diameter of the end portion.

The object indicated above is achieved in the third aspect of the present invention, which provides an overlapping welding method in which a first member and a second member whose thickness is smaller than a thickness of the first member are overlapped with each other, and welded to each other along an end edge of the second member, wherein (a) a step portion is provided in the first member along the end edge of the second member by recessing a protruding portion that outwardly protrudes from the end edge so that the protruding portion is drawn back from the second member; and (b) the first member and the second member are welded to each other at a portion extending from the end edge of the second member to the step portion of the first member.

In the operating pedal, because the step portion is provided in the first member along the end edge of the second member, it is possible to efficiently and intensively input heat to the portion extending from the end edge of the second member to the step portion of the first member. Thus, it is possible to ensure a predetermined throat thickness, thereby improving joint strength, while suppressing occurrence of heat strain. Further, because heat is appropriately released from the protruding portion that is provided to be continuous with the step portion, expansion of a melted area in the members is prevented. This also suppresses a decrease in the throat thickness, and heat strain in the first member. In the overlapping welding method according to the third invention as well, it is possible to obtain the substantially same advantageous effects.

According to the second aspect of the present invention, the boss with a cylindrical shape is disposed to extend through the pedal arm that is made of a thin plate, and that has a hollow structure, and the boss is integrally welded to the pedal arm. The inner diameter of the boss is constant over an entire length of the boss, and the step portion is provided by decreasing the outer diameter of the end portion in the axial direction, which outwardly protrudes from the boss attachment cylindrical portion of the pedal arm. It is possible to efficiently and intensively input heat to the portion extending from the end edge of the boss attachment cylindrical portion to the step portion of the boss. In addition, because heat is released from the end portion of the boss that is provided to be continuous with the step portion, it is possible to ensure the predetermined throat thickness, thereby improving the joint strength, while suppressing occurrence of heat strain.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 1A and 1B are diagrams each showing a brake pedal for a vehicle, to which the invention is applied, FIG. 1A is a left side view, and FIG. 1B is a front view;

FIGS. 3A and 3B are diagrams each explaining a joining structure in which a pedal arm and a boss are joined to each other in the brake pedal in FIGS. 1A and 1B, FIG. 3A is an enlarged view of a section taken along a line IIIA-IIIA in FIG. 2, and FIG. 3B is a sectional view showing an enlarged IIIB portion in FIG. 3A, which is rotated by 90° in a counterclockwise direction;

FIGS. 6A and 6B are diagrams each of which explains an example of a conventional joining structure in which a pedal arm and a boss are joined to each other, and which correspond to FIGS. 3A and 3B, respectively, FIG. 6A is an enlarged view corresponding to a section taken along the line IIIA-IIIA in FIG. 2, and FIG. 6B is a sectional view showing an enlarged VIIB portion in FIG. 6A, which is rotated by 90° in the counterclockwise direction.

DETAILED DESCRIPTION OF EMBODIMENTS

The invention is appropriately applied to a vehicle operating pedal, for example, a brake pedal for a service brake or a parking brake, and an accelerator pedal. However, the invention can be applied to an operating pedal other than the vehicle operating pedal. The second invention relates to a case where a boss with a cylindrical shape is joined to a pedal arm that is made of a thin plate and has a hollow structure, by welding. For example, the invention can be applied to a case where a pedal sheet is welded to a sheet attachment plate portion provided at a lower end portion of the pedal arm, and the thickness of the pedal sheet is larger than the thickness of the sheet attachment plate portion. The invention can be also applied to an operating pedal that includes a pedal arm other than the pedal arm with a hollow structure. Further, the invention can be applied to a case where a member other than the boss and the pedal sheet is integrally welded to the pedal arm. Thus, the invention can be applied to various operating pedals each of which is formed by welding two members constituting the operating pedal.

It is appropriate to employ a welding method in which welding is operated by melting only base materials (a first material and a second material) without using a welding material, as a welding method for welding the first member and the second member to each other. For example, plasma arc welding and TIG welding that are non-consumable electrode welding methods, laser welding, and electron beam welding may be employed. It is preferable that a length T of a step portion of the first member and a thickness "t" of the second member should satisfy a relation, $2.0t \le T$, to ensure a predetermined throat thickness, thereby improving joint strength while suppressing occurrence of heat strain. Also, the length T of the step portion is preferably equal to or smaller than 3.0t, and more preferably equal to or smaller than 2.5t so that expansion of a melted area in the members, and heat strain are prevented by releasing heat from a protruding portion.

It is preferable that the step portion should be formed to extend in a direction substantially perpendicular to an end edge of the second member (i.e., a direction substantially perpendicular to a direction in which the protruding portion protrudes). However, the step portion may be inclined from the direction perpendicular to the end edge, for example, by an angle equal to or smaller than approximately 30°. In this case, the inclination angle is appropriately set to be in a range in which predetermined welding quality is obtained. The step portion is formed, for example, by decreasing the plate thickness (thickness) of the protruding portion as in the second invention. However, the step portion may be formed by operating a bending process, a drawing process, a forging process, or the like to deform the first member so that the thickness of step portion is substantially constant, and has a crank-shaped section.

The pedal arm, which is made of a thin plate and has a hollow structure, may have various configurations. For example, the pedal arm may be formed by bending one steel plate or the like into a cylindrical shape, or may be formed using a square pipe or the like. The pedal arm may be formed by integrally joining paired half bodies that are made of steel plates or the like, and have hat-shaped sections or the like, by welding or the like, while the half bodies face each other, and flanges at outer peripheral portions of the half bodies are overlapped with each other so that the flanges are in contact with each other. The operating pedal with a hollow structure need not necessarily be pouched, that is, the entire periphery of the operating pedal need not necessarily be closed. A portion of the periphery of the operating pedal may be open.

A boss attachment cylindrical portion with a cylindrical shape in the second invention is provided, for example, by operating a burring-hole forming process. The step portion formed at an end portion of the boss is provided, for example, by operating a cutting process on an outer peripheral surface thereof, or operating a forging process. However, it is possible to employ other processing methods to form the step portion. In the second invention, the inner diameter of the boss is constant, and only the outer diameter of the boss is changed. However, for example, it is possible to change the inner diameter as well so that the thickness is substantially constant.

Embodiment

Figure 1A:
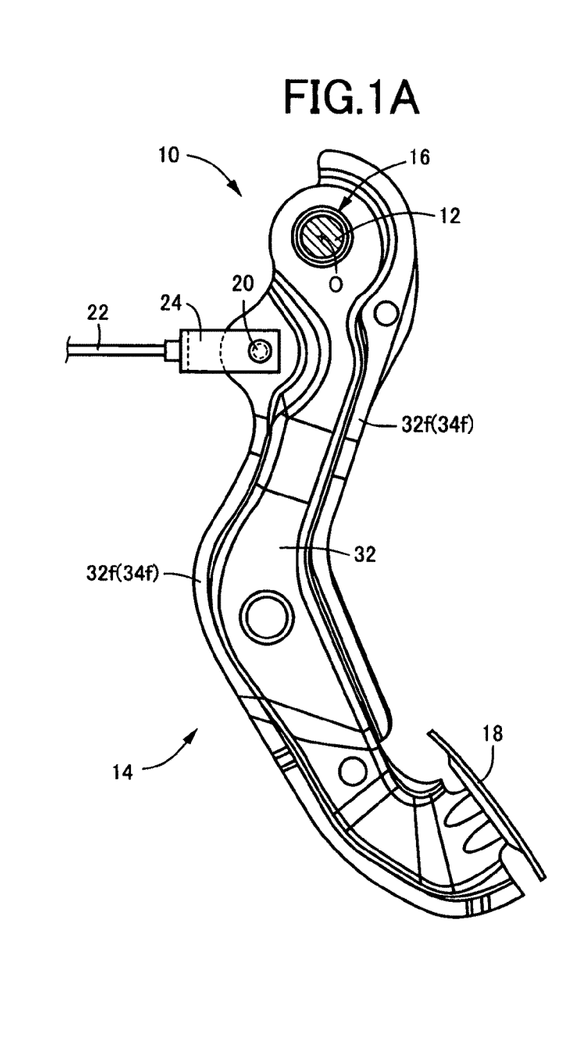
Figure 1B:
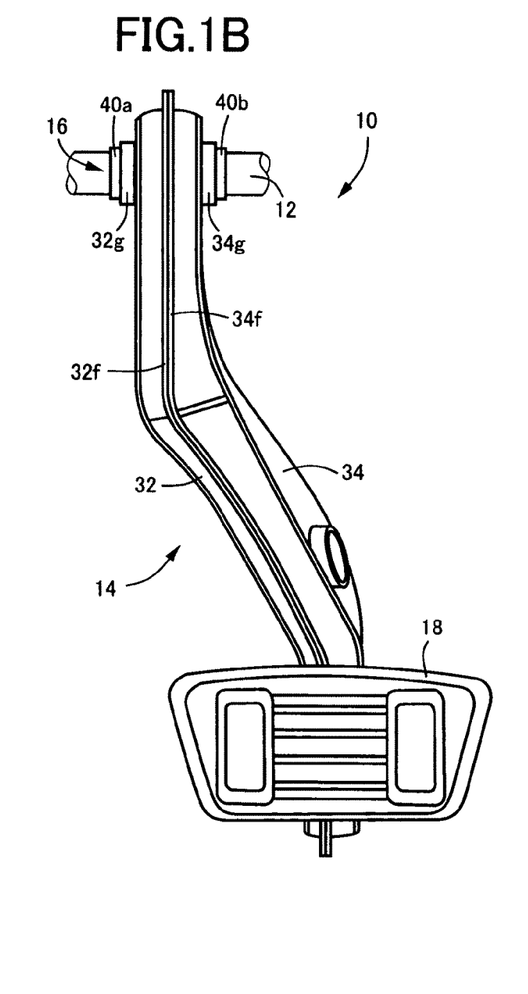
Figure 2:
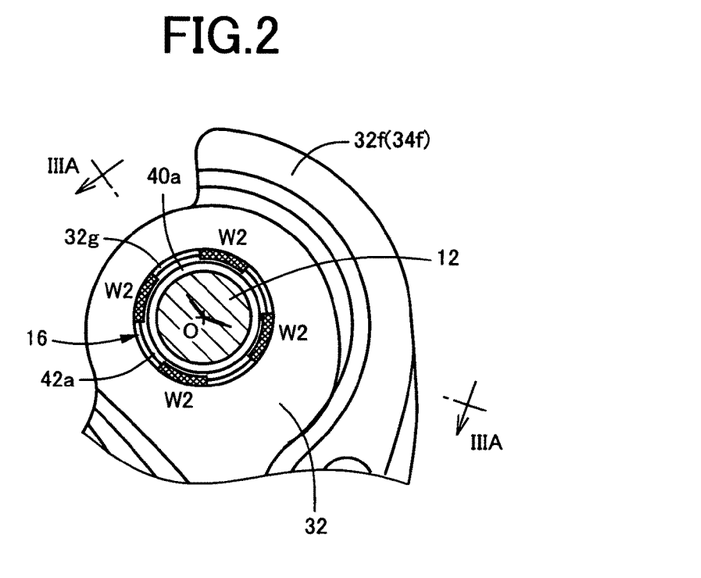
FIG. 2 is a diagram showing an enlarged support portion at an upper end portion, which is supported by a support shaft in FIG. 1A.
Figure 3A:
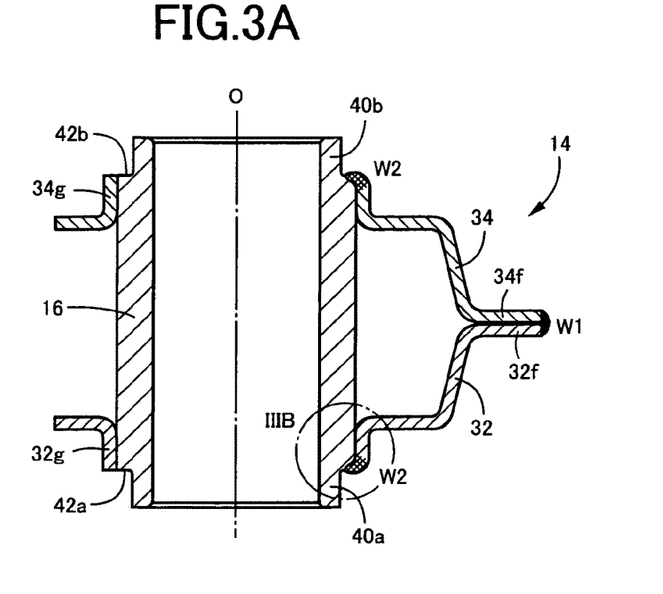
Figure 3B:
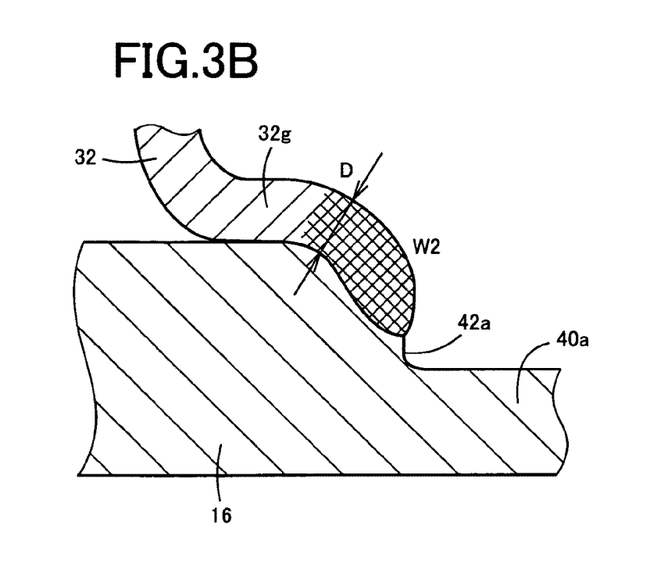

Hereinafter, an embodiment of the invention will be described in detail with reference to the drawings. FIGS. 1A and 1B are diagrams each showing a brake pedal 10 for a service brake of a vehicle. FIG. 1A is a left side view, and FIG. 1B is a front view. FIG. 2 is an enlarged view of an upper end portion in FIG. 1A. FIGS. 3A and 3B are diagrams each explaining a joining structure in which a pedal arm 14 and a boss 16 are joined to each other in the brake pedal 10, FIG. 3A is an enlarged view of a section taken along a line IIIA-IIIA in FIG. 2, and FIG. 3B is a sectional view showing an enlarged IIIB portion in FIG. 3A, which is rotated by 90° in a counter-clockwise direction. The brake pedal 10 corresponds to an operating pedal according to the embodiment of the invention. The brake pedal 10 includes the pedal arm 14 as a main component. The boss 16 with a cylindrical shape, which is integrally fixed to the upper end portion of the pedal arm 14, is concentrically fitted to a support shaft 12. Thus, the operating pedal 10 is supported to be pivotable around a center line O of the boss 16. The center line O of the boss 16 substantially coincides with a shaft center of the support shaft 12.

A pedal sheet 18 in the form of a plate is integrally fixed to a lower end of the pedal arm 14. When the pedal sheet 18 is depressed by a driver, the brake pedal 10 is pivoted around the support shaft 12 in a clockwise direction in FIG. 1A. A push rod 22 of a brake master cylinder is connected to the brake pedal 10 through a crevice 24 so that the push rod 22 is relatively pivotable around an axis of a connection pin 20 that is substantially parallel to the support shaft 12. When the push rod 22 is mechanically pressed toward a left side in the figure due to the pivoting of the brake pedal 10, a brake hydraulic pressure is generated in accordance with depressing force of the brake pedal 10. The push rod 22 is urged to protrude from the brake master cylinder. When the pedal sheet 18, which has been depressed, is released, the brake pedal 10 is returned, that is, pivoted around the support shaft 16 in the counter-clockwise direction due to the urging force, and thus, the brake pedal 10 is maintained in an original position shown in FIG. 1A.

The pedal arm 14 is made of a thin plate and has a hollow structure. The pedal arm 14 is constituted by paired half bodies 32 and 34 each of which has a shape obtained by dividing the pedal arm 14 in half in a width direction of the vehicle, that is, a right-left direction in FIG. 1B. Each of the half bodies 32 and 34 is formed by pressing and bending a steel plate, and has a substantially hat-shaped section. While open sides of the hat-shaped sections of the half bodies 32 and 34 face each other, and outer peripheral flanges 32f and 34f are overlapped with each other so that the outer peripheral flanges 32f and 34f are in close contact with each other, outer end edges of the outer peripheral flanges 32f and 34f, that is, end edges extending in a front-rear direction and a top-bottom direction of the vehicle are integrally welded to each other by plasma arc welding that is a non-consumable electrode welding method. The outer peripheral flanges 32f and 34f are provided around open portions of the half bodies 32 and 34 to extend outwardly, and parallel to each other. In FIG. 3A, a first joining portion W1 (a blacked-out region) indicates a joining portion at which the outer peripheral flanges 32f and 34f are joined to each other. The outer peripheral flanges 32f and 34f are provided in the pedal arm 14 excluding an upper end front portion located on a left side of the boss 16 in FIG. 3A, and a lower end rear portion to which the pedal sheet 18 is fixed, and the outer peripheral flanges 32f and 34f are integrally welded to each other.

Boss attachment cylindrical portions 32g and 34g are provided at upper end portions of the paired half bodies 32 and 34, to which the boss 16 is fixed, as shown in FIG. 3A. Each of the boss attachment cylindrical portions 32g and 34g with a cylindrical shape is provided to outwardly protrude by operating a burring-hole forming process or the like. The inner diameter of each of the boss attachment cylindrical portions 32g and 34g is substantially equal to the outer diameter of the boss 16. The boss 16 is fitted in the boss attachment cylindrical portions 32g and 34g to extend through the boss attachment cylindrical portions 32g and 34g. While each of end portions 40a and 40b in the axial direction protrudes by a predetermined length, the boss 16 and the boss attachment cylindrical portions 32g and 34g are integrally welded to each other at fitting portions of the boss attachment cylindrical portions 32g and 34g, that is, at portions at which the boss 16 and the boss attachment cylindrical portions 32g and 34g are overlapped with each other, by plasma arc welding that is the non-consumable electrode welding method, as well as at the first joining portion W1. The thickness of the boss 16 is sufficiently larger than the thickness (plate thickness) of each of the boss attachment cylindrical portions 32g and 34g. The inner diameter of the boss 16 is constant over an entire length thereof. However, the outer diameter of each of the end portions 40a and 40b in the axial direction, which outwardly protrude from the boss attachment cylindrical portions 32g and 34g, respectively, is decreased, for example, by operating a cutting process on outer peripheries of the end portions 40a and 40b, or operating a forging process. Thus, step portions 42a and 42b are provided along end edges of the boss attachment cylindrical portions 32g and 34g, respectively, at the substantially same positions as the positions of the end edges of the boss attachment cylindrical portions 32g and 34g, respectively. The step portions 42a and 42b extend in a direction substantially perpendicular to the end edges. The plasma arc welding is operated along L-shaped corners that extend from outer peripheral surfaces of the end edges of the boss attachment cylindrical portions 32g and 34g to the step portions 42a and 42b, respectively. In FIG. 2 and FIGS. 3A and 3B, second joining portions W2 (mesh regions) indicate joining portions at which the boss attachment cylindrical portions 32g and 34g are joined to the boss 16. As evident from FIG. 2, in the embodiment, the welding is operated at predetermined four portions located at equal angle intervals around the center line O. Each of the predetermined four portions extends in an angle range of approximately 45°. The boss 16 corresponds to the first member. The pedal arm 14 corresponds to the second member. The end portions 40a and 40b of the boss correspond to the protruding portions.

Figure 4:
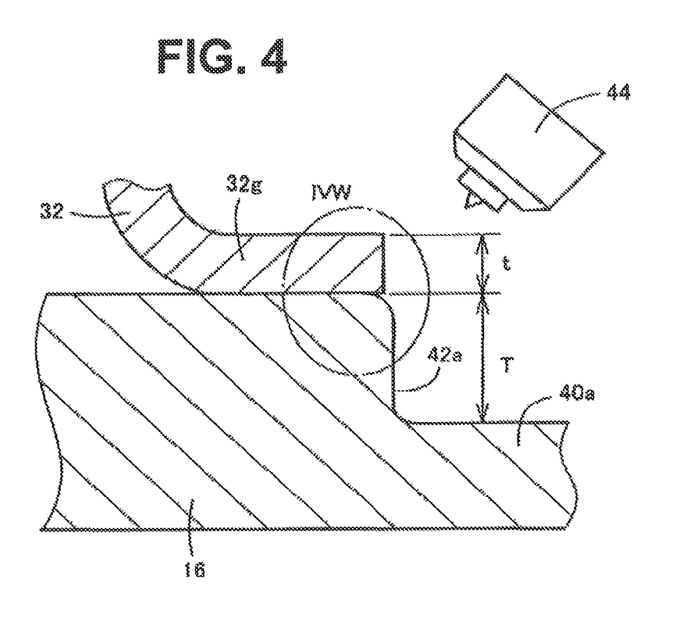
FIG. 4 is a sectional view showing a state before welding is operated at a second joining portion W2 in FIG. 3B.

FIG. 4 shows the same portion as the portion shown in FIG. 3B in a state before the plasma arc welding is operated. A welding torch 44 for plasma arc welding is moved along the L-shaped corner extending from the outer peripheral surface of the end edge of the boss attachment cylindrical portion 32g to the step portion 42a of the boss 16 to input heat to a target joining portion IVW shown by a chain line. In this case, because the step portion 42a is provided, it is possible to efficiently and intensively input heat to the target joining portion IVW in the boss attachment cylindrical portion 32g and the boss 16. Thus, it is possible to ensure a predetermined throat thickness, thereby improving joint strength, while suppressing occurrence of heat strain and expansion of a melted area in the members. In the embodiment, a throat thickness D (refer to FIG. 3B) is substantially equal to an original thickness "t" of the boss attachment cylindrical portion 32g. Thus, it is preferable that the length T of the step portion 42a should be set to be equal to or larger than two times the thickness "t" of the boss attachment cylindrical portion 32g, and equal to or smaller than the three times the thickness "t" of the boss attachment cylindrical portion 32g (i.e., the length T and the thickness "t" should satisfy the relation: $2.0t \leq T \leq 3.0t$), in order to ensure the predetermined throat thickness D while suppressing occurrence of heat strain and expansion of the melted area in the members.

Thus, in the brake pedal 10 according to the embodiment, the boss 16 with a cylindrical shape is disposed to extend through the pedal arm 14 that is made of a thin plate, and that has a hollow structure, and the boss 16 is integrally welded to the pedal arm 14. The step portions 42a and 42b are provided by decreasing the outer diameters of the end portions 40a and 40b in the axial direction, which outwardly protrude from the boss attachment cylindrical portions 32g and 34g of the pedal arm 14, respectively. The plasma arc welding is operated on the L-shaped corner portions that extend from the outer peripheral surfaces of the end edges of the boss attachment cylindrical portions 32g and 34g to the step portions 42a and 42b, respectively. Therefore, it is possible to efficiently and intensively input heat to the target joining portions IVW in the boss attachment cylindrical portions 32g and 34g and the boss 16. Thus, it is possible to ensure the predetermined throat thickness D, thereby improving the joint strength, while suppressing occurrence of heat strain. Further, the end portions 40a and 40b are provided integrally with the step portions 42a and 42b, respectively, in a manner such that the end portions 40a and 40b are continuous with the step portions 42a and 42b, respectively, and each of the end portions 40a and 40b protrudes by the predetermined length. Thus, heat is appropriately released from the end portions 40a and 40b. Therefore, it is possible to prevent expansion of the melted area in the members. This also suppresses a decrease in the throat thickness D, and heat strain in an inner peripheral surface of the boss 16.

Figure 5A:
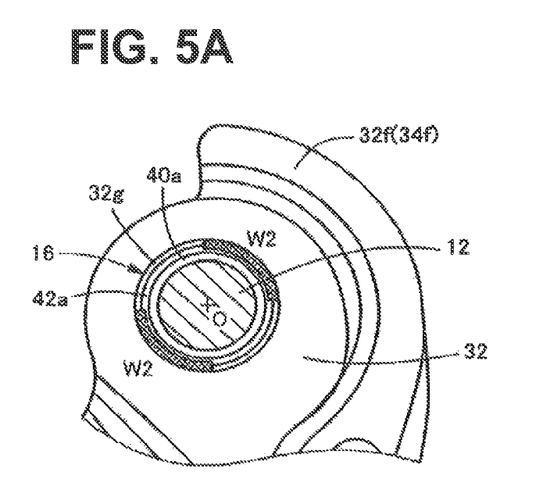
FIGS. 5A and 5B, which are diagrams explaining other embodiments of the invention, are left side views corresponding to FIG. 2.
Figure 5B:
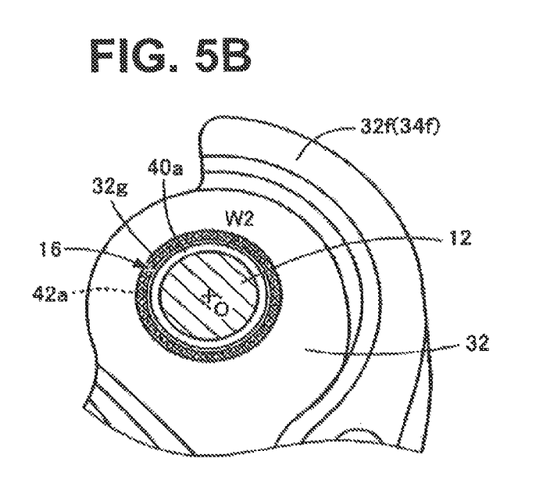

In the above-described embodiment, the pedal arm 14 and the boss 16 are welded to each other at the four portions around the center line O. Each of the four portions extends in the angle range of approximately 45°. However, as shown in FIG. 5A, the pedal arm 14 and the boss 16 may be welded to each other at two portions that are symmetrically located with respect to the center line O, and each of the two portions may extend in the angle range of approximately 90°. Further, as shown in FIG. 5B, the pedal arm 14 and the boss 16 can be welded to each other over an entire circumference around the center line O.

Although the embodiments of the invention have been described in detail with reference to the drawings, the embodiments are merely examples, and the invention can be implemented in various forms obtained by altering or modifying the embodiments based on the knowledge of those skilled in the art.

What is claimed is:

1. An operating pedal including a joining portion at which a first member and a second member whose thickness is smaller than a thickness of the first member are overlapped with each other, and welded to each other along an end edge of the second member, a step portion being provided in the first member along the end edge of the second member, the step portion recessing a protruding portion that protrudes in a direction away from the end edge and decreasing a thickness of the entire protruding portion smaller than other portions of the first member so that the protruding portion is drawn back from the second member, and the step portion being formed to extend in a direction substantially perpendicular to the direction in which the protruding portion protrudes; and the first member and the second member being welded to each other only at a portion extending from the end edge of the second member to the step portion of the first member.

2. The operating pedal according to claim 1, wherein the second member is a pedal arm which is made of a sheet material and has a hollow structure, and in which a boss attachment cylindrical portion with a cylindrical shape is provided to outwardly protrude;

the first member is a boss with a cylindrical shape, which is disposed to extend through the boss attachment cylindrical portion, and integrally welded to the boss attachment cylindrical portion, and of which the operating pedal is supported to be pivotable around a center line; and an inner diameter of the boss is constant over an entire length of the boss, the protruding portion is an end portion in an axial direction, which outwardly protrudes from the boss attachment cylindrical portion, and the step portion is provided by decreasing an outer diameter of the end portion.

3. An overlapping welding method in which a first member and a second member whose thickness is smaller than a thickness of the first member are overlapped with each other, and welded to each other along an end edge of the second member, wherein a step portion is provided in the first member along the end edge of the second member, the step portion recesses a protruding portion that protrudes in a direction away from the end edge and decreases a thickness of the entire protruding portion smaller than other portions of the first member so that the protruding portion is drawn back from the second member, and the step portion is formed to extend in a direction substantially perpendicular to the direction in which the protruding portion protrudes; and the first member and the second member are welded to each other at only a portion extending from the end edge of the second member to the step portion of the first member.

* * * * *